US008214427B2

(12) United States Patent
Gautier et al.

(10) Patent No.: US 8,214,427 B2
(45) Date of Patent: Jul. 3, 2012

(54) SYSTEM AND METHOD FOR DISTRIBUTING A MAP OF CONTENT AVAILABLE AT MULTIPLE RECEIVERS

(75) Inventors: Eric Gautier, Rennes (FR); François-Louis Tariolle, Liffre (FR); Jean-Baptiste Henry, Melesse (FR)

(73) Assignee: Thompson Licensing (FR)

( * ) Notice: Subject to any disclaimer, the term of this patent is extended or adjusted under 35 U.S.C. 154(b) by 0 days.

(21) Appl. No.: 12/736,874

(22) PCT Filed: May 14, 2009

(86) PCT No.: PCT/EP2009/055878
§ 371 (c)(1),
(2), (4) Date: Nov. 18, 2010

(87) PCT Pub. No.: WO2009/141269
PCT Pub. Date: Nov. 26, 2009

(65) Prior Publication Data
US 2011/0072075 A1    Mar. 24, 2011

(30) Foreign Application Priority Data

May 20, 2008    (EP) ..................................... 08305184

(51) Int. Cl.
*G06F 15/16* (2006.01)
(52) U.S. Cl. .......................... 709/203; 709/219; 709/223
(58) Field of Classification Search .................. 709/203, 709/217, 219, 223, 201
See application file for complete search history.

(56) References Cited

U.S. PATENT DOCUMENTS

| 6,055,568 | A  | * | 4/2000 | Adams ........................... 709/221 |
| 6,185,619 | B1 | * | 2/2001 | Joffe et al. .................... 709/229 |
| 6,263,368 | B1 | * | 7/2001 | Martin ........................... 709/224 |
| 6,339,785 | B1 | * | 1/2002 | Feigenbaum ................. 709/213 |
| 7,089,301 | B1 | * | 8/2006 | Labio et al. ................... 709/224 |

(Continued)

FOREIGN PATENT DOCUMENTS

EP    0993163    4/2000

(Continued)

OTHER PUBLICATIONS

Wan et al., "An overlay network architecture for data placement strategies in a P2P streaming network ," Advanced Information Networking and Applications, 2004. AINA 2004. 18th International Conference on vol. 1, Digital Object Identifier: 10.1109/AINA.2004. 1283898, Publication Year: 2004 , pp. 119-125 vol. 1.*

(Continued)

*Primary Examiner* — Oanh Duong
(74) *Attorney, Agent, or Firm* — Jack Schwartz and Associates, PLLC

(57) ABSTRACT

The present invention concerns a content server device and a content receiver device, and a method at said devices for sending content in a robust mode. In particular the invention concerns a method at a peer to peer client to receive content from a server, the method comprising the steps of receiving content from a server in a multicast mode, indicating to the server the content that has been correctly received, receiving from the server in a multicast mode a content availability map indicating the content available at each peer and requesting the missing content from the peer indicated in the content availability map.

7 Claims, 3 Drawing Sheets

U.S. PATENT DOCUMENTS

| | | | |
|---|---|---|---|
| 7,844,593 B2* | 11/2010 | Li | 707/707 |
| 2002/0049760 A1* | 4/2002 | Scott et al. | 707/10 |
| 2002/0188838 A1* | 12/2002 | Welder | 713/2 |
| 2003/0065763 A1* | 4/2003 | Swildens et al. | 709/224 |
| 2005/0246417 A1* | 11/2005 | Raith et al. | 709/203 |
| 2006/0149806 A1* | 7/2006 | Scott et al. | 709/201 |
| 2007/0156815 A1* | 7/2007 | Mate et al. | 709/204 |
| 2008/0101317 A1* | 5/2008 | Bouazizi | 370/342 |
| 2009/0264064 A1* | 10/2009 | Hyun et al. | 455/3.06 |
| 2009/0319849 A1* | 12/2009 | Burklin et al. | 714/748 |

FOREIGN PATENT DOCUMENTS

| | | |
|---|---|---|
| EP | 1633111 | 3/2006 |
| EP | 1841141 | 10/2007 |
| EP | 1901525 | 3/2008 |
| WO | WO03024021 | 3/2003 |
| WO | WO 2008031721 A1 * | 3/2008 |
| WO | WO2008107830 | 9/2008 |

OTHER PUBLICATIONS

Paila et al., "IETF Sttandard, FLUTE—File Delivery Over Unidirectional Transport; rfc 3926.txt", Internet Engineering Task Force, CH, Oct. 1, 2004.

ETSI Standards, "Digital Video Broadcasting (DVB); Transport of MPEG-2 TS Based DVB Services over IP Based Networks", European Broadcasting Union, vol. BC, No. 41.3.1, Cedex, France, Oct. 1, 2007.

Siebert et al., "Hybrid Broadband/Broadcast systems and Set-Top Boxes", Broadband Multimedia Systems and Broadcasting, Piscataway, NJ, Mar. 31, 2008, pp. 1-6.

Search Report Dated Aug. 12, 2009.

* cited by examiner

SYSTEM AND METHOD FOR DISTRIBUTING A MAP OF CONTENT AVAILABLE AT MULTIPLE RECEIVERS

This application claims the benefit, under 35 U.S.C. §365 of International Application PCT/EP09/055,878, filed May 14, 2009, which was published in accordance with PCT Article 21(2) on Nov. 26, 2009 in English and which claims the benefit of European patent application No. 08305184.7, filed on May 20, 2008.

FIELD OF THE INVENTION

The present invention relates generally to distribution of video on demand and in particular to a method where the video on demand is distributed to multiple receivers.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

DVB-IP Content Download System task force is in charge of specifying a standard for video on demand services based on the download of content to the local storage of a home network device such as Set Top Box or a Residential Home Gateway, over a controlled IP network such as a DSL network under Internet Service Provider control. CDS commercial requirements have been edited in the CM-IPTV0102r15 "Commercial Requirements for downloading IPTV content and management of local storage", from the DVB-CM IPTV group. The CDS specification is integrated in the DVB-IPTV specification which is currently available as DVB blue book document A086 Rev. 7 Sep. 2008 before next ETSI publication of TS 102 034 v1.4.1 document.

The main characteristics of the CDS specification are:
It provides two VOD service modes:
  Push service mode initiated by the service provider and based on the download of the entire content; Dedicated to blockbusters
  Pull service mode based on a user initiated content download; Dedicated to all the contents but the blockbusters
These two service modes rely on three basic content download mechanisms:
  Multicast using File Delivery over Unidirectional Transport (FLUTE) protocol as defined in RFC 3926
  Unicast using HTTP protocol
  Peer to peer, noted P2P, using a dedicated protocol based on HTTP request redirection to several peer clients in order to distribute the content download over these peer clients.
Each service can use any or a combination of download mechanisms. A push service for example can be implemented in using the multicast protocol to push the content to the client devices and the P2P protocol to repair errors during the multicast distribution phase. The pull service can be implemented in using the HTTP protocol with a possible redirection toward a multicast or a P2P delivery in the case the number of user requests for one content increases more or less importantly.

SD&S/BCG are used to announce available contents by service type and the protocols to download them. SD&S/BCG supports unicast (HTTP) or multicast (DVB-STP) protocols based announcement. The SD&S/BCG specification allowing CDS services announcement is described in DVB blue book document A086 Rev. 7 Sep. 2008.

The CDS specification proposes a push service mode based on the proactive download of the entire content to the client local storage. Such a service mode is quite adapted to the distribution of blockbusters because it allows the users to access content instantaneously. But this service mode is also restrictive for the usage of the device storage because the entire content is duplicated on every client. On the other hand CDS proposes also a pull service mode without any proactive content download. The pull service is used for the distribution of all the content. But the blockbusters need a download delay time before the user can access the content.

P2P with proactive targeted content push strategies uses essentially unicast protocols to proactively distribute the content fragments to the peers on the network. Moreover lots of P2P protocols use a unicast protocol as well as in the phase of seeking the peers which can serve the requesting content than in the phase of downloading the requesting content from these peers. The use of unicast protocol is sometimes totally justified, either because other protocols like multicast are not available (e.g. in uncontrolled environments like Internet), or in other situation where one of the major design constraint of the solution is the optimization of the peer storage which leads to a solution where every peer stores a different content fragment and therefore where multicast protocol is not efficient to be used.

SUMMARY OF THE INVENTION

The present invention attempts to remedy at least some of the concerns connected with content distribution in the prior art, by providing a method for distributing a content availability map.

The present invention concerns a method at a peer to peer client to receive content from a server, the method comprising the steps of receiving content from a server in a multicast mode, indicating to the server the content that has been correctly received, receiving from the server in a multicast mode a content availability map indicating the content available at each peer and requesting the missing content from the peer indicated in the content availability map.

The receivers are made aware of the content available at the peer receivers, in order to facilitate recovering missing content from peer receivers. The receiver does not need to request the missing file from the server. The receiver directly asks the correct peer without asking a server.

The CDS specification supports the possibility to combine multicast and P2P protocols. Such a combination is used to implement efficiently a CDS service based on a "P2P with proactive targeted content push" distribution mode. Such a service is dedicated to the distribution of moderate popularity contents. This allows service operators to offer more contents with a better utilization of the client local storage. At the time where the operators offer services including more and more contents, this is a significant argument for the success of CDS services deployment.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 to 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of CDS and FLUTE, but the invention is not limited to this particular environment and may be applied within other frameworks where content is distributed to multiple receivers, and a map of content available at each receiver is distributed to all receivers. The receivers may then receiver missing content from the peer receivers.

Figure 1:
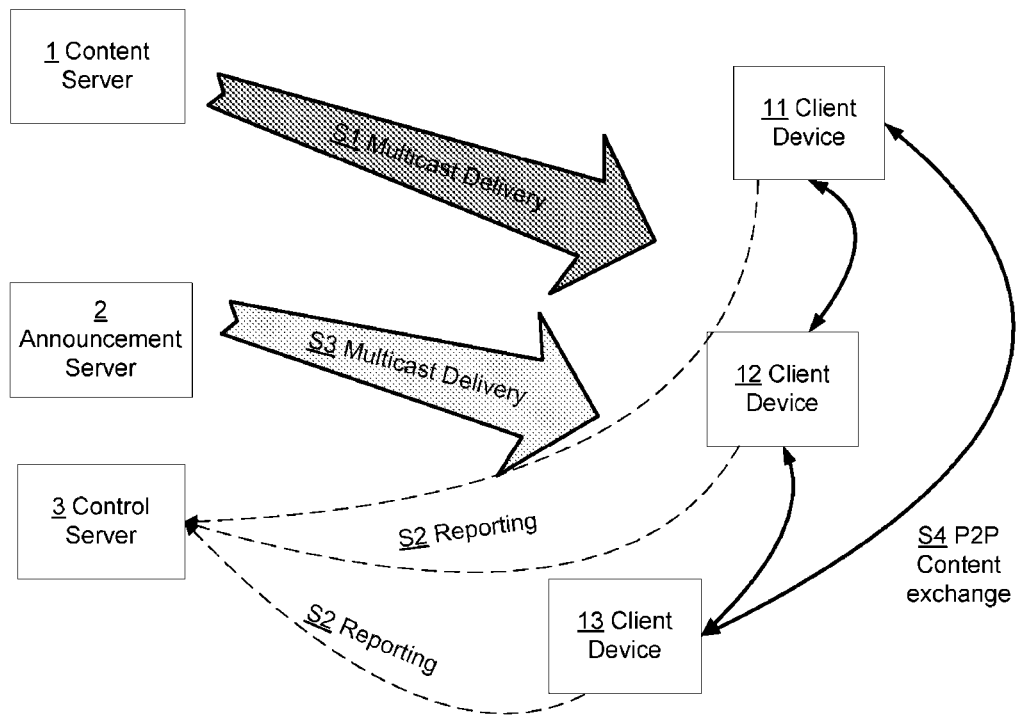
FIG. 1 illustrates the network architecture compliant with the embodiment.

The embodiment of the invention comes within the context of a content download system in line with the DVB-IP/CDS requirements. The network architecture framework is based on a controlled operator network as illustrated in FIG. 1. It is composed of:
- a multicast content server 1 capable of pushing efficiently the content to the client devices,
- a control server 3 providing remote management and reporting functionalities for the client devices,
- an announcement server 2 to signal to the clients the detail of the services delivery,
- a number of client devices 11, 12, 13 capable to cooperatively distribute content amongst themselves and providing an access to the operator services for the users.

The operator has registered the clients and allocated a "Client-Type" to each client. The number of client type is limited to "n". This allocation is carried out by the operator remote management system which is implemented between the control server and the clients.

In these conditions a "P2P with proactive targeted content push" delivery proceeds with the following steps:

Step 1: Proactive Push of Fragments of Content

At step 1.a, each piece of content of this proactive push is divided in as many fragments as client types and the multicast server is used to push each fragment in all the clients which have the same "Client-Type". This "targeted push" can be implemented using only one multicast FLUTE session to transport all the content fragments to all the types of clients or in using one multicast FLUTE session by client type.

Each multicast session carries some FLUTE File Delivery Table instances, noted FLUTE FDT as indicated in RFC 3926, to describe the transported content fragments. Each content fragment is identified in the "Content_Location" field of the FDT instance by the "Content-Fragment-URI". An example of such an FDT instance is given in the table 1 below.

A strategy such the one described in the patent application EP1901525 and combining a multicast delivery and a P2P delivery can be used to make this proactive content fragments push reliable. The table 1 indicates the FDT instance describing a content fragment transported in a multicast session

TABLE 1

| Element/Attribute Name | Element/Attribute Description |
| --- | --- |
| FDT-Instance-Attributes | Common Attributes for all the contents described by the FDT instance |
| Expiration-Time | FDT Instance Expiration time |
| Send-Complete | Describe if FDT instance is complete or not (e.g. describe all the contents to be delivered in the session) |
| Multi-Contents-Delivery-Attributes | Attributes related to the delivery of the multi-contents |
| FEC-OTI-FEC-Encoding-ID | Identification of FEC algorithm |
| FEC-OTI-FEC-Instance-ID | FEC instance depending on the FEC algorithm identification |
| FEC-OTI-Maximum-Source-Block-Length | The maximum number of source symbols per source block |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source block |
| FEC-OTI-Scheme-Specific-Info | |
| Multi-Contents-Attributes | Attributes related to the multi-contents |
| Content-Type | MIME media type of content |
| Content-Encoding | Compression |
| Download-Content-Attributes (one per content) | |
| Content-Delivery-Attributes | Attributes related to the delivery of the content |
| TOI | Transport Object Identifier |
| Transfert-Length | Size of the transport object carrying the content |
| FEC-OTI-FEC-Encoding-ID | Identification of FEC algorithm |
| FEC-OTI-FEC-Instance-ID | FEC instance depending on the FEC algorithm identification |
| FEC-OTI-Maximum-Source-Chunk-Length | The maximum number of source symbols per source chunk |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source chunk |
| FEC-OTI-Scheme-Specific-Info | |
| Content-Attributes | Attributes related to the content itself |
| Content-Type | MIME media type of content |
| Content-Encoding | Compression |
| Content-Location | Identification and location of the content fragment to download e.g. "Content-Fragment-URI" |
| Content-Length | Size of the content fragment |
| Content-Digest | Hash of the content fragment (MD5) |

At step 1.b, before the download of the content fragments, the announcement mechanism is used to push to the client the detailed information for it to access the content fragment in the multicast session(s) according to its "Client-Type". An example of such announcement data is indicated in the table 2 below that shows the SD&S/BCG announcement of a "targeted push" service. This announcement is transported by the SD&S/BCG protocols. This example is based on the announcement of a CDS service type which uses a FLUTE multicast delivery and in which a "Client-Type" field allows the client to determine the content fragment that it has to download. The other fields of this table are described in the current CDS specification.

TABLE 2

| Element/Attribute Name | Element/Attribute Description |
| --- | --- |
| Service-Type | The location where the Content Download Service may be found |
| Service-Type | "Targeted Push" |
| Content-Id-List | List of the content fragments in the session |
| Content-Fragment-URI | List of the content fragment in the session |
| Client-Type | Type of client |
| Multicast-Delivery Mode | Information regarding the multicast delivery session |
| Multicast-Delivery-Mode | Scheduled or Carousel |
| Start-date-and-time of the content delivery session | Start date and time of the Multicast Content Delivery Session |
| End-date-and-time of the content delivery session | End date and time of the Multicast Content Delivery Session (Carousel mode only) |
| Transport-Session-Identifier (TSI) | Uniquely identify a FLUTE session for a given IP source address |
| IP-Multicast-Address@Source | One IP sender address per content delivery session |
| IP-Multicast-Address@Address | Multicast address |
| Number-of-Channels-in-the-session | Use of multiple LCT channels to deliver the content fragments in a single FLUTE session |
| IP-Multicast-Port-Number for each channel in the session | Port number corresponding to each channel number |
| Max-Bandwidth-Requirement par channel | Max bandwidth to be used by each multicast channel |
| Completion-Poll | Information regarding the completion polling mechanism |
| Completion-Poll-Server-URI | Identification and location of the Completion Poll Server |
| Backup-Completion-Poll-Server-URI | List of backup Completion-Pool-Servers URI |
| Recovery-Mode | Information regarding the Recovery mechanism |
| Recovery-Server-URI | Identification and location of the Recovery Server |
| Backup-Recovery-Server-URI | List of backup Recovery Servers URI |
| Recovery-Request-Distribution | Information regarding the distribution of the Recovery requests |
| Request-Distribution-Offset-Time | The time that a client shall wait to start the file recovery procedure or to notify the correct reception of the content fragment |
| Request-Distribution-Random-Time-Period | The time window length over which a client shall calculate a random time for the initiation of the file recovery procedure to notify the correct reception of the content fragment |
| Reception Reporting | Information regarding the reception reporting mechanism |
| Reporting-Server-URI | Identification and location of the Reporting Server |
| Backup-Reporting-Server-URI | List of backup Reporting-Servers URI |
| Reporting-Request-Distribution | Information regarding the distribution of the reporting request |
| Request-Distribution-Offset-Time | The time that a client shall wait to start the reporting procedure or to notify the correct reception of the content fragment |
| Request-Distribution-Random-Time-Period | The time window length over which a client shall calculate a random time for the initiation of the reporting procedure to notify the correct reception of the content fragment |
| P2P-Delivery-Mode | Information regarding the Recovery mechanism |
| P2P-Delivery-Server-URI | Identification and location of the Recovery Server |
| Backup-P2P-Delivery-Server-URI | List of backup Recovery Servers URI |

At step 1.c, upon successful reception of the fragments corresponding to its client type and that for all the content items of the "targeted push" session, each client has to report to the control server the good reception of these fragments. Back-off timing is used to spread the load of the control server over time during the reporting procedure. With this information the control server is able to identify the clients (with parameters such as their IP address, and the Client-Type . . . ). The control server then knows which content fragments the clients have downloaded (Content-Fragment-URI).

An example of content fragment reception reporting message is given in the table 3 below. This message is very close to the reporting message specified in the CDS specification. The use of the fields "Multicast-Delivery-Session-List" and "Recovery-Delivery-Server-Source-List" of this table are described in that specification.

In case of alternative multiple servers-based content delivery, the server_source_ID field indicates which server uploaded the content.

TABLE 3

| Element/Attribute Name | Element/Attribute Description |
| --- | --- |
| Client-ID | Identification of the client i.e. Client_IP_address:_listen_port" |
| Service-Type | "Targeted Push" service mode |
| Content-Fragment-List | |
| Content-Fragment-URI (one per content fragment) | Identification of the downloaded content fragment |
| Multicast-Delivery-Session-List | |
| Session-ID (one per multicast session) | Identification of the FLUTE Session |
| Byte-Range-List | |
| Byte-Range (one per Byte-range) | Identification of the content fragment byte range |

TABLE 3-continued

| Element/Attribute Name | Element/Attribute Description |
| --- | --- |
| Recovery-Delivery-Server-Source-List | |
| Server-Source-ID (one per server source) Byte-Range-List | Server-Source-URI which provided the content fragment |
| Byte-Range (one per Byte-range) | Identification of the content fragment byte range |

Step 2: Proactive Push of the "Content Availability Map

At step 2.a, once the clients have all downloaded and reported the successful reception of the content fragments corresponding to their "Client-Type", the operator initiates another multicast session or uses the previous multicast session(s) to push to each client the information describing the availability of the content fragments pushed in all the other clients. These content availability information can be built by the control server which has all the relevant information thanks to the reporting procedure. Once built, these content availability information are sent to the multicast server and then pushed to the client devices.

An example of such content availability information is given in the table 4 below. This table is called the "CAM: Content Availability Map". This table describes each piece of content whose fragments have been proactively downloaded. For each piece of content, the table includes a list of peers ("Peer-List") which identifies the peers which have downloaded the fragments of the content. This peer list is divided in subset of peers ("Peer-Subset") which store the same fragment of the content. In each subset of peers the downloaded content fragment is identified by the "Available-Chunk-List" field which gives the chunks of content available. The size of the chunks per content items is given in the "Content-Map" field of the table.

The content fragment and the content chunk are generally different entities and the relation between them is known a priori (number of chunks by fragment, number of chunks in the last fragment . . . ). The content fragment is dedicated to the distribution of the content by the multicast delivery while the content chunk is dedicated to distribution of the content by the P2P delivery. The size of the content fragment is generally superior to the size of the content chunk and a content fragment is the concatenation of some content chunks which can be contiguous or not.

TABLE 4

| Element/Attribute Name | Element/Attribute Description |
| --- | --- |
| Content-List | List of contents of the "targeted push session" |
| Content-Item | |
| Content-Map (one per content item) | |
| Content-URI Content-Length Content-Chunk-Length | Content Identifier Length of the content Length of a chunk of content |
| Peer-List | List of peers |
| Peer-Subset (one per fragment) | Subset of peers |
| Available-Chunk-List (one per peer subset) | List of content chunks available per peer subset (to identify the position of each chunk in the |

TABLE 4-continued

| Element/Attribute Name | Element/Attribute Description |
| --- | --- |
| | whole content, this field is: a list of byte range boundaries in the whole content or a bitfield of Nc bits (Nc = number of chunks of the whole content) where each bit-value is 1 if the corresponding chunk is owned by this peer subset). |
| Peers list in the subset | |
| Peer-URI | Identification of the peers |

At step 2.b, the multicast session used to push the CAM is announced in adding a multicast session announcement as described in the table 5 below, in the previous SD&S/BCG announcement. There is no "Client-Type" field in this announcement which means that every client device has to download this "Content Availability Map" whatever its "Client-Type".

TABLE 5

| | |
| --- | --- |
| Content-Id-List | List of Contents in the session |
| CAM-URI | Identifier of Content Availability Map |
| Multicast-Delivery Mode | Information regarding the multicast delivery session |
| Multicast-Delivery-Mode | Scheduled or Carousel |
| Start-date-and-time of the content delivery session | Start date and time of the Multicast Content Delivery Session |
| End-date-and-time of the content delivery session | End date and time of the Multicast Content Delivery Session (Carousel mode only) |
| Transport-Session-Identifier (TSI) | Uniquely identify a FLUTE session for a given IP source address |
| IP-Multicast-Address@Source | One IP sender address per content delivery session |
| IP-Multicast-Address@Address | Multicast address |
| Number-of-Channels-in-the-session | Use of multiple LCT channels to deliver the content in a single FLUTE session |
| IP-Multicast-Port-Number for each channel in the session | Port number corresponding to each channel number |
| Max-Bandwidth-Requirement par channel | Max bandwidth to be used by each multicast channel |

The FLUTE FDT instance transported in the multicast session and describing the "Content Availability Map" object is described as in the table 6 below:

TABLE 6

| Element/Attribute Name | Element/Attribute Description |
| --- | --- |
| FDT-Instance-Attributes | Common Attributes for all the contents described by the FDT instance |
| Expiration-Time Send-Complete | FDT Instance Expiration time Describe if FDT instance is complete or not (e.g. describe all the contents to be delivered in the session) |
| Multi-Contents-Delivery-Attributes | Attributes related to the delivery of the multi-contents |
| FEC-OTI-FEC-Encoding-ID FEC-OTI-FEC-Instance-ID | Identification of FEC algorithm FEC instance depending on the FEC algorithm identification |

TABLE 6-continued

| Element/Attribute Name | Element/Attribute Description |
|---|---|
| FEC-OTI-Maximum-Source-Block-Length | The maximum number of source symbols per source block |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source block |
| FEC-OTI-Scheme-Specific-Info | |
| Multi-Contents-Attributes | Attributes related to the multi-contents |
| Content-Type | MIME media type of content |
| Content-Encoding | Compression |
| Download-Content-Attributes (one per content) | |
| Content-Delivery-Attributes | Attributes related to the delivery of the content |
| TOI | Transport Object Identifier |
| Transfert-Length | Size of the transport object carrying the content |
| FEC-OTI-FEC-Encoding-ID | Identification of FEC algorithm |
| FEC-OTI-FEC-Instance-ID | FEC instance depending on the FEC algorithm identification |
| FEC-OTI-Maximum-Source-Chunk-Length | The maximum number of source symbols per source chunk |
| FEC-OTI-Encoding-Symbol-Length | Length of encoding symbols in bytes |
| FEC-OTI-MaxNumber-Of-Encoding-Symbols | Maximum Number of Encoding Symbols that can be generated for a source chunk |
| FEC-OTI-Scheme-Specific-Info | |
| Content-Attributes | Attributes related to the content itself |
| Content-Type | MIME media type of content |
| Content-Encoding | Compression |
| Content-Location | Identification and location of the content to download e.g. "CAM-URI" |
| Content-Length | Size of the content |
| Content-Digest | Hash of the content (MD5) |

Step 3: Content Request

At step 3.a, once the client device has received the "Content Availability Map", it can propose content to the user who can request to download one of them.

At step 3.b, since the requesting client device doesn't store all the needed content fragments, it needs to retrieve the missing fragments stored in the other client devices. To identify these peer client devices the requesting client uses directly the "Content Availability Map" without needing to interrogate a central server or the other peers. With this Table the requesting client can know exactly the content chunks that it has previously stored and then the list of peers that can serve the missing contents chunks.

Figure 2:
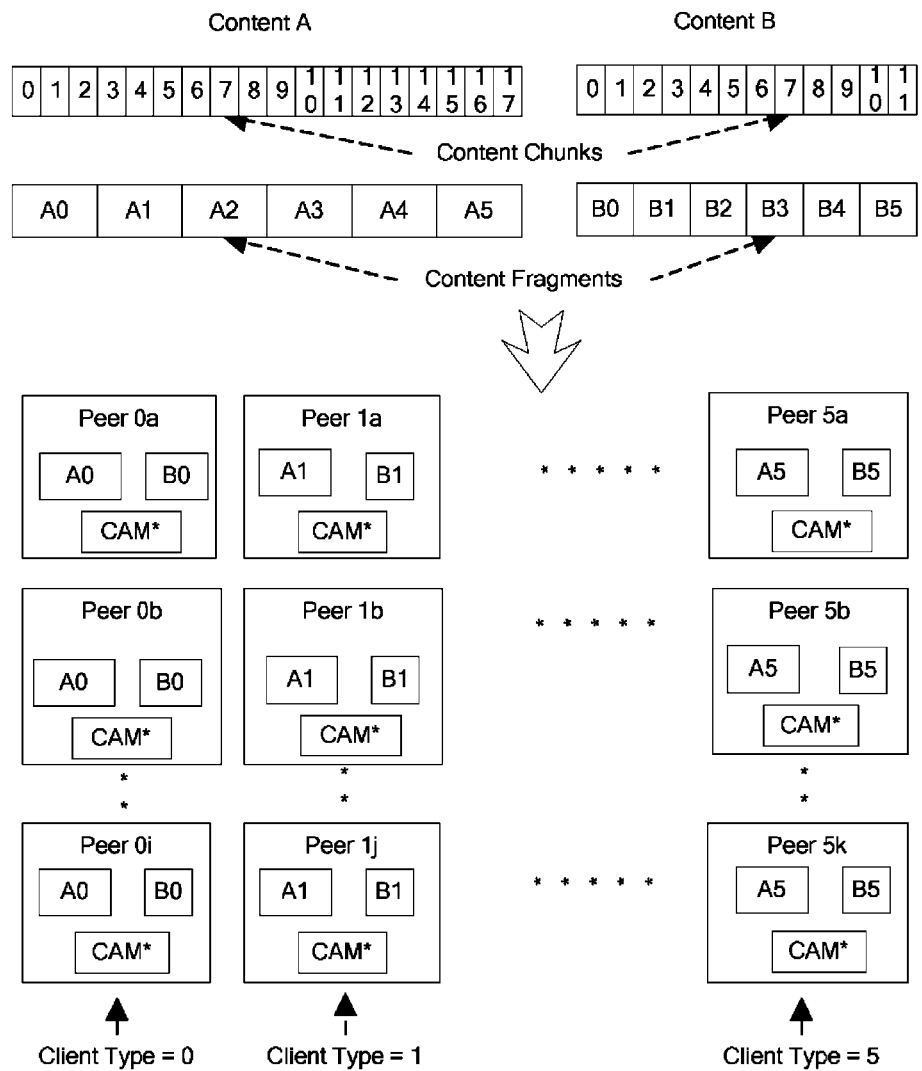
FIG. 2 illustrates content available at the peers according to the embodiment.

The embodiment is illustrated in the FIG. 2 which shows the peers status after the push of the content fragments and the Content Availability Map (CAM). A client device "Peer 1$b$" which wants to download the content "B" uses the "Content Availability Map":
- to determine the content chunks that it has already downloaded (Chk2, Chk3),
- to determine the content chunks that it has to download (Chk0, Chk1, Chk4 . . . Chk11)
- to choose the peers to download them (for example, P0$a$→Chk0, P0$b$→Chk1, P2$a$→Chk4 . . . , P5$b$→Chk11)

In order to limit the P2P exchanges locally and possibly under the DSLAM in a DSL network, the embodiment is improved.

Figure 3:
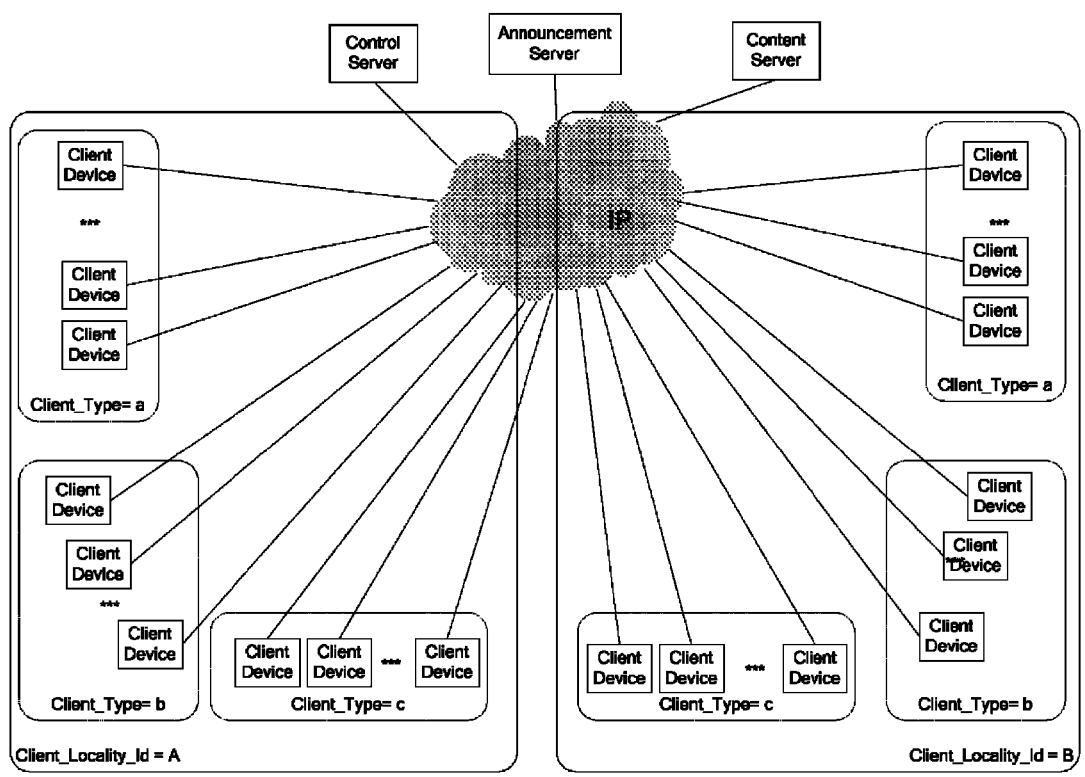
FIG. 3 illustrates the repartition of the different type of client devices by local zones according to the embodiment.

The "Content Availability Map" is different for each local area. A "Local Content Availability Map" (LCAM) is locally pushed to all the client devices identified by a "Client-Locality-Id". This identifier is managed by the operator Remote System Control the same way that the "Client-Type" identifier. The FIG. 3 illustrates the repartition of the different type of client devices ("Client-Type") by local zone ("Client-Locality-Id").

One way to facilitate the building of the "LOAM" by the control server is to add the locality identifier ("Client-Locality-Id") in the content fragment reception reporting message as described in the table below.

TABLE 7

| Element/Attribute Name | Element/Attribute Description |
|---|---|
| Client-Id | Identification of the client i.e. Client_IP_address:_listen_port" |
| Service-Type | "Targeted Push" service mode |
| Client-Locality-Id | Identification of the locality of the client device |
| Content-Fragment-List | |
| Content-Fragment-URI (one per content fragment) | Identification of the downloaded content fragment |
| Multicast-Delivery-Session-List | |
| Session-Id (one per multicast session) | Identification of the FLUTE Session |
| Byte-Range-List | |
| Byte-Range (one per Byte-range) | Identification of the content fragment byte range |
| Recovery-Delivery-Server-Source-List | |
| Server-Source-Id (one per server source) | Server-Source-URI which provided the content fragment |
| Byte-Range-List | |
| Byte-Range (one per Byte-range) | Identification of the content fragment byte range |

Each "Local Content Availability Map" is then locally pushed with a targeted multicast session identical to the one used to push the content fragments in the client devices but based on the "Client-Locality-Id" identifier.

In this case an example of multicast session announcement to push the "Local Content Availability Map" is described in the table below:

TABLE 8

| Content-Id-List | List of the contents in the session |
|---|---|
| LCAM-URI | "Local Content Availability Map" identifier |
| Client-Locality-Id | Identifier of the client device locality |
| Multicast-Delivery Mode | Information regarding the multicast delivery session |
| Multicast-Delivery-Mode | Scheduled or Carousel |
| Start-date-and-time of the content delivery session | Start date and time of the Multicast Content Delivery Session |
| End-date-and-time of the content delivery session | End date and time of the Multicast Content Delivery Session (Carousel mode only) |
| Transport-Session-Identifier (TSI) | Uniquely identify a FLUTE session for a given IP source address |
| IP-Multicast-Address@Source | One IP sender address per content delivery session |
| IP-Multicast-Address@Address | Multicast address |
| Number-of-Channels-in-the-session | Use of multiple LCT channels to deliver the content in a single FLUTE session |

TABLE 8-continued

| | |
|---|---|
| IP-Multicast-Port-Number for each channel in the session | Port number corresponding to each channel number |
| Max-Bandwidth-Requirement par channel | Max bandwidth to be used by each multicast channel |

The FLUTE FDT instance transported in the multicast session and describing the "Local Content Availability Map" object is described as in the table 6, where "Content-Location" is set to 'LCAM-URI'.

According to a first alternative of the embodiment, the CAM is prepared a priori and sent in the FLUTE session with content fragments. A network operator has good knowledge of its network topology. He is able to build a theoretical ideal CAM based on this topology and without waiting for reception reporting messages from its clients. This CAM can thus be pushed with all corresponding content fragments in a single FLUTE session.

That variant embodiment uses only a single announcement via SD&S and a single FLUTE session (instead of two). The client reception reporting to a centralized control server becomes useless to ensure P2P download. If a report is needed for other purposes, a completion polling mechanism exists in CDS so that only a subset of clients report successful reception to the centralized control server.

According to a second alternative of the embodiment, proximity information between peers is introduced. The "Client-Locality-Id" is part of the description of a peer list, i.e. peers of the same locality, a peer can identify its neighbors and contact only them to download all other fragments.

The notion of neighborhood may be widen to create a region, a list of near localities. These new fields are inserted in CAM as shown in the table 8 below:

TABLE 8

| Element/Attribute Name | Element/Attribute Description |
|---|---|
| Content-List | List of contents of the "targeted push session" |
| Content-Item | |
| Content-Map (one per content item) | |
| Content-URI | Content Identifier |
| Content-Length | Length of the content |
| Content-Chunk-Length | Length of a chunk of content |
| Peer-List | List of peers |
| Peer-Subset (one per fragment) | Subset of peers |
| Available-Chunk-List (one per peer subset) | List of content chunks available per peer subset (to identify the position of each chunk in the whole content, this field is: a list of byte range boundaries in the whole content or a bitfield of Nc bits (Nc = number of chunks of the whole content) where each bit-value is 1 if the corresponding chunk is owned by this peer subset). |
| Peers List in the subset (one per locality and per fragment) | |
| Client-Locality-Id Peers List in a same locality | Locality Id of peers |
| Peer-URI | Identification of the peers of the same locality which have received the same fragment |
| Region-List | List of regions of the "targeted push session" |
| Region Client-Locality-Id | A region is a list of near localities Locality Id of very near peers |

Use of region is used to get closer to the network topology and to give the client device the possibility to access in a hierarchic way from near to far clients if necessary (in case of unavailability of clients in term of connection or CPU load . . . ).

In a generic way, this hierarchy could have more than two levels, and it would become a data structure like a tree representing an abstraction of the network topology at a level configured by the operator. "Region" field could be renamed "Region-Level-1" in table 8.

The CAM could be extended to contain characteristic properties of each locality, qualitative data above all (average bit rate capacity for download and for upload, . . . ), precious information so that clients can choose the best locality when necessary.

The CAM could be updated periodically to reflect the state of the download progression over the network. The operator could choose the updating level(s), either precisely at the chunk level, or macroscopically at the fragment level (only for peers having complete fragments), and to add/remove a peer from the CAM depending on its connection status. This update could be applied whatever the original CAM is theoretical or not.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. Method at a peer client for receiving content, said method comprising the steps of:
   receiving a plurality of piece of content from a first server in a multicast mode;
   indicating to a second server the piece of content that have correctly been received;
   receiving from a third server, in a multicast mode, a content availability map indicating piece of content available at each of other peer clients in a local zone, wherein the content availability map is locally pushed in the multicast mode to all peer clients in the local zone identified by a client locality identifier; and requesting a missing piece of content from one of the other peer clients at which said missing piece of content is available, as indicated in said content availability map.

2. Method according to claim 1, said peer client indicating to the server localization of said peer client.

3. Method according to claim 2, said content availability map indicating the localization of said other peer clients.

4. Method according to claim 3, said peer client requesting said missing piece of content from said one of the other peer clients in a hierarchic way from a near to a far peer client.

5. Method according to claim 1, comprising the step of indicating to said second server an identifier of the first server from which said plurality of piece of content have been received.

6. Method according to claim 1, said plurality of piece of content being received using FLUTE (File Delivery over Unidirectional Transport) protocol.

7. Method according to claim 1, said content availability map being received using FLUTE protocol.

* * * * *